Nov. 24, 1953  A. P. DOUGLAS ET AL  2,660,448
STEERING GEAR MOUNTING FOR JUVENILE VEHICLES
Filed Aug. 14, 1950  3 Sheets-Sheet 1

INVENTORS,
ALVIN P. DOUGLAS
LEONARD J. WALTERS
BY
*Fay, Gobrick & Fay*
ATTORNEYS

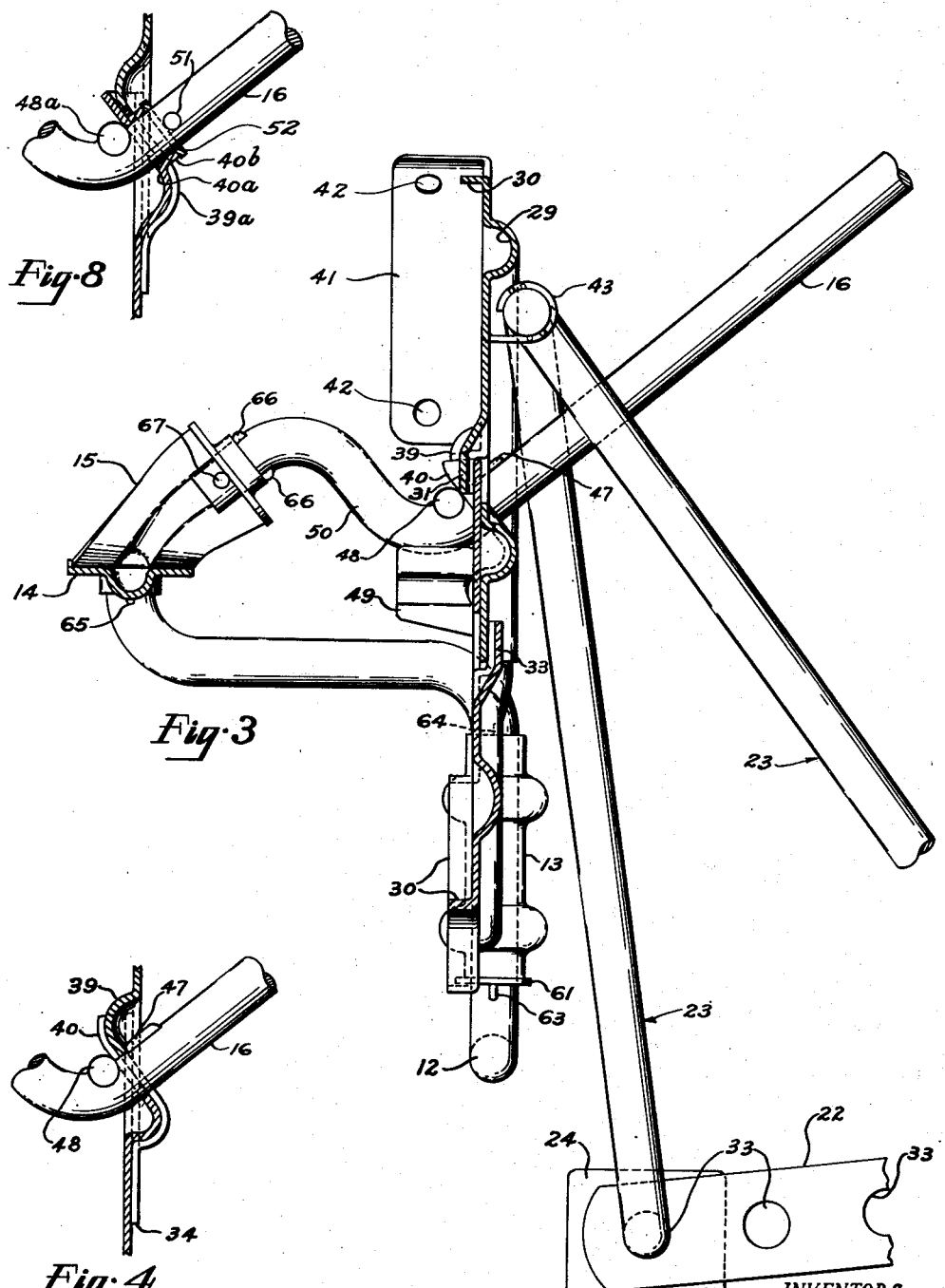

Nov. 24, 1953  A. P. DOUGLAS ET AL  2,660,448
STEERING GEAR MOUNTING FOR JUVENILE VEHICLES
Filed Aug. 14, 1950  3 Sheets-Sheet 3

INVENTORS,
ALVIN P. DOUGLAS
LEONARD J. WALTERS
BY
Fay, Golrick & Fay
ATTORNEYS

Patented Nov. 24, 1953

2,660,448

UNITED STATES PATENT OFFICE 2,660,448

STEERING GEAR MOUNTING FOR JUVENILE VEHICLES

Alvin P. Douglas, Cleveland, and Leonard J. Walters, Shaker Heights, Ohio, assignors to The Murray Ohio Manufacturing Company, Cleveland, Ohio, a corporation of Ohio Application August 14, 1950, Serial No. 179,118

13 Claims. (Cl. 280—87.01)

1

The present invention relates to improvements in a structure and method of assembly of the front cross-members of the chassis and the steering gear for a juvenile vehicle, such as pedal-driven automobiles, trucks and the like.

In the manhfacture of children's autos, trucks and similar pedal-driven vehicles it has been the practice of the prior art in certain types of design to sub-assemble the steering knuckles, tie rods, drag link and the pedal hangers onto a front cross-member structure formed out of stamped sheet metal, which sub-assembly could be incorporated as a unit into the body of the vehicle in the final assembly. When a diversity of models is being manufactured requiring different dimensions in the span of the front cross-member, several different corresponding types of front sub-assemblies are required in these dimensions. The present invention embraces a structure in which the front axle beam and the front cross-member of the chassis which is directly fastened to the vehicle body are separate parts, the former carrying most of the steering control apparatus as a sub-assembly. Thus only the front cross-member need vary in span to accommodate varying vehicle body dimensions, while the axle beam with the parts assembled thereto constitute a standard and major sub-assembly.

One of the objects of the present invention is the provision of a structure embracing the front chassis members and steering gear in which a single uniform sub-assembly, including the steering knuckles, tie rod, drag link and front axle beam, may be assembled and used for a diversity of models, despite variations in the dimensions of the span of the vehicle bodies among several models.

Another object is the provision of such a chassis sub-assembly in which the front cross-member, which is attached to the body of the vehicle, is separate from the front axle beam for convenience in packaging and shipping sub-assemblies of the vehicle.

Another object of the invention is the provision of complementary front cross-member and front axle beam structures which may be readily assembled in a foolproof and certain manner.

Other objects and adavntages of the invention will be apparent from the following detailed description of preferred forms of embodiment of the invention, reference being made to the accompanying drawings wherein—

Fig. 1 is a front elevational view of the front cross-member and front axle beam member with the steering gear assembled therewith;

2

Fig. 3 is an enlarged sectional view taken along the line 3—3 in Fig. 1;

Fig. 4 is a detailed partial sectional view taken along the line 4—4 in Fig. 2, showing the manner in which the steering shaft is journalled between the front cross-member and the front axle beam;

Fig. 5 is a front perspective view of the front cross-member of this invention before the pedal members are assembled thereon;

Fig. 6 is a front view in perspective of the front axle beam before the assembly of the steering gear mechanism thereto;

Fig. 7 is a top view in detail of the end of the front axle beam, corresponding to Fig. 6;

Fig. 8 is a view, similar to Fig. 4, for a modification of the steering shaft journalling structure;

Fig. 9 is a fragmentary view, in front perspective, showing the steering shaft boss structure of the front cross member of the modified form of Fig. 8; and Fig. 10 is a fragmentary view showing a modified boss structure of the front axle beam corresponding to Figs. 8 and 9.

Figure 1:
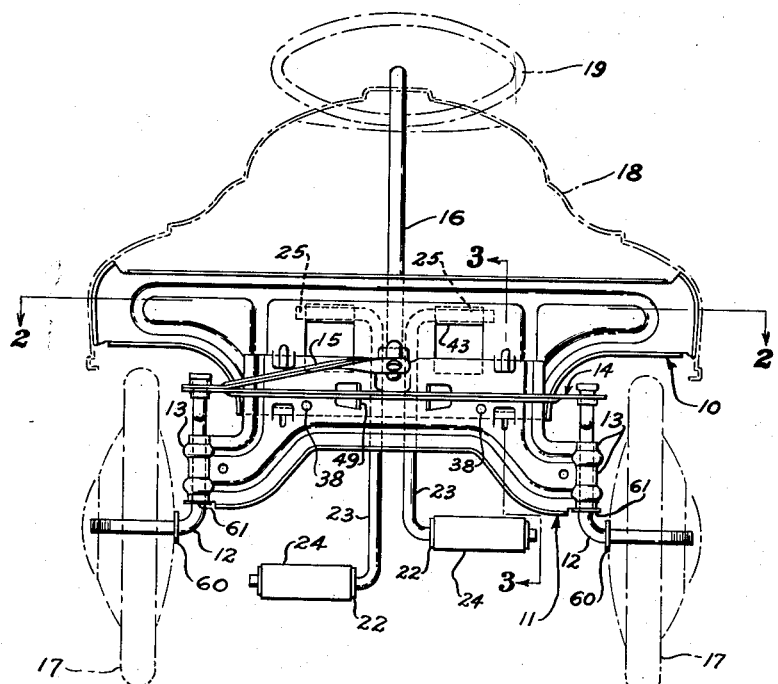
Figure 2:
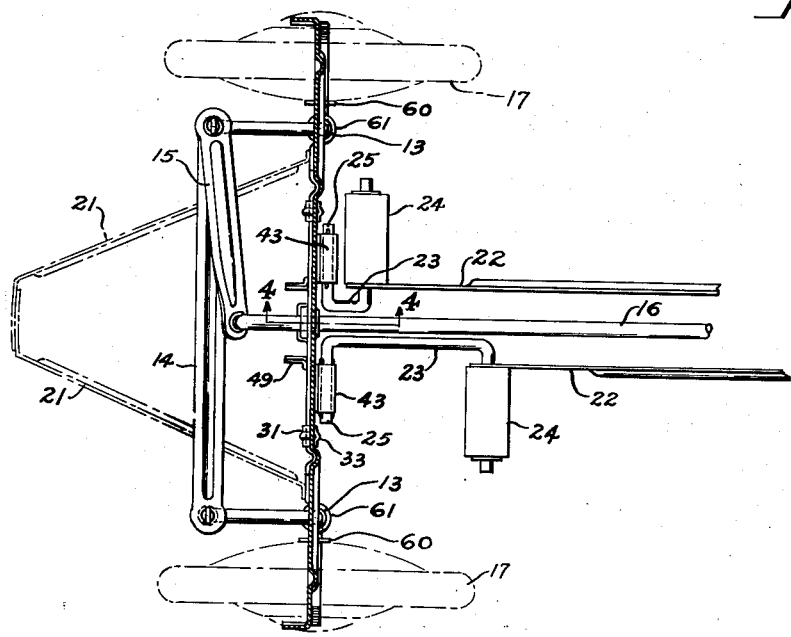
Fig. 2 is a horizontal section taken along the line 2—2 in Fig. 1.

In Fig. 1 the front sub-assembly for the chassis of a juvenile vehicle, comprising an upper plate or front cross-member generally indicated 10, a lower plate or front axle beam 11 carried thereby, steering knuckles 12 mounted in the journals 13 on the ends of the axle beam, the tie rod 14 connecting the upper ends of the steering knuckles, a drag link 15 and steering shaft 16, is shown in relation to other parts of the vehicle outlined in dot and dash lines, namely the front wheels 17, the sheet metal body 18 and the steering wheel 19. Other pertinent structures are more clearly seen in Fig. 2 wherein are shown front struts or braces 21, likewise outlined in dot and dash lines, extending forwardly from the outer ends of the front axle beam toward the forward end of the body, and the pull straps 22 extending rearwardly from the lower part of rocking pedal hangers 23 adjacent the pedals 24, the rearward part of the pull straps connected to the rear driving crank axle being omitted.

The front cross-member 10 and the front axle beam 11, both formed by stamping from sheet metal, are provided with suitable groove or channel formations 29 and flanges 30 which confer structural strength and rigidity upon these members. The lower portion of the cross-member 10 and the upper portion of the front axle beam 11 are complementary in structure to adapt them to be readily nested or fitted together in proper position and bolted to hold them securely with respect to each other. To this end, the vertical portions of formations 29 are similarly spaced, so that in the overlap the raised side of formation 29 on member 11 nests in a corresponding groove in member 10, while lug structures 31, pressed out of the metal of the cross-member, are adapted to receive thereunder the upper edge 32 of the front axle beam. The front axle beam is provided with similar lug structures 33 to receive and position the lower edge 34 of the front cross-member. The apertures 36 and 37, in the front cross-member and the front axle beam respectively, are in register when the two members are fitted to receive bolts 38. In the lower part of the front cross-member and the upper part of the axle beam, the slanted complementary shaped bosses 39 and 40 are provided with round bottom slots or notches adapted to accommodate the steering shaft 16 when the two members are fastened together with the bosses nesting. As can be seen in the drawings (Fig. 4), the slotted faces of the bosses are slanted with respect to members 10 and 11 at such angle as to be substantially at right angles to the desired position of the steering shaft 16.

The front cross-member is also provided at each end with flanges 41 to fit the contour of the vehicle body with which used, the flanges having apertures 42 by which the member may be secured by rivets or other means to the body of the vehicle. Horizontal cylindrically formed pedal mounting structures 43 are provided on the front cross member to receive and journal the upper pivot extensions 25 of the pedal hangers. These pedal mounting structures, designated 43 in the assembled cross-member, are shown in Fig. 5 as simple stamped-out projections 43a partially curled along the outer edge and extending rearwardly from the cross-member. The pedal hangers 23 are mounted therein by positioning the horizontal pivot extensions 25 on the top of the extension 43a and then curling the extension 43a around the pivot portion. Nibs projecting radially from the extension 25 at both ends of each pedal mounting 43 serve to keep the pedal hanger from axial displacement in the mounting.

On the front axle beam the forwardly extending stops 49, likewise stamped out from the metal, serve to limit the rotation of the crank arm 50 formed at the lower end of the steering shaft. To maintain the shaft 16 in proper position, locating formations or nibs 47 and 48 are formed thereon in spaced relation to accommodate the boss portions of the cross-member and axle beam therebetween as shown in the detail fragmentary view of Fig. 4.

A modified form of the boss structure may be used to receive the steering shaft, such as that shown in Figs. 8, 9 and 10, wherein 39a indicates the notched boss of the upper plate, and 40a the corresponding boss in the lower plate provided with a flanged aperture 40b instead of a slot for receiving the steering shaft. The form of the plate is generally the same with the exception of the boss structures, which still nest together as in the first form, with the flanged structure 40b being received by the slot in the boss 39a. The steering shaft is held in position in the flanged aperture 40b by a nib 43a like nib 48 of the first form, but the nib 47 is replaced by a pin 51 passed through a transverse aperture in steering shaft 16 just above the washer 52 on the flange of aperture 40b.

Before the steering knuckles are assembled into the front axle beam the ends 13 are only partially formed, as shown in Figs. 6 and 7 wherein they are designated 13a. The steering knuckles 12 are positioned in the uncurled or open ends 13a of the axle beam and thereafter the ends are pressed or curled about the knuckle to the form shown in dotted lines in Fig. 7 forming the finished end journal 13. The steering knuckles are provided toward the inner end of the front wheel axle portion with washers 60 which are held from inward displacement by nibs formed on the periphery of the axle, while washers 61 resting on similar nibs 63 furnish a bearing surface for the lower edge of the end journals 13. Above the upper edge of the end journal 13 nibs 64 are provided on the steering knuckle which, with nibs 63 and washer 61, serve as locating means to position the vertical pivot portions of the knuckle within the end journal 13 from vertical displacement. Inwardly from the upper end of the steering knuckle, nibs 65 support the tie rod 14. One end of the drag link 15 fits on the upper end of one of the steering knuckles above the tie rod, and the upper ends of the knuckles are staked or flattened to retain the tie rod and drag link thereon. Nibs 66 position the other end of the drag link on the end of the crank arm 50, while a pin 67 or other fastener retains the drag link thereon.

In the manufacture of vehicles embodying the present invention, the various elements to be assembled, including the front cross-member 10 and front axle beam 11 in the condition shown in Figs. 5 and 6, are produced by methods known to the metal working art. The front axle beam can be of one standard size suitable for use in several models of vehicles, the adaptation to varying body dimensions being furnished by the use of cross-members 11 of different span and flange dimensions. The order of operations in the sub-assembling of the standard axle beam is as follows: The steering knuckles, previously furnished with the washers and nibs thereon, are placed in the open ends 13a, the ends are pressed or curled into the finished end journal form 13, and the tie rod 14 and drag link 15 are placed on the upper ends of the knuckles which are then staked to hold the members in place. For the cross-member sub-assembly the pedal hangers 23 are placed on the projection 43a, which are then curled or pressed to form the cylindrical mounting 43. This latter sub-assembly can then be secured in place by suitable means in the vehicle body for which it is designed.

When it is desired to ship the vehicle in compact form, the vehicle may be packed and shipped in sub-assembled units, comprising, insofar as the present invention is concerned, the front axle beam sub-assembly, the body with the front cross-member in place, and the steering shaft. When the final assembly is to be made the steering shaft is positioned in the boss of the lower plate, either in the slot or in aperture 40b depending upon the boss structure used, the lower plate is positioned on the front cross-member, the drag link is fastened on the end of the crank arm 50 with pin 67, and then with the members 10 and 11 simply pushed together to final exact register, the bolts 38 are inserted and drawn up. Due to the complementary form of members 10 and 11, they are readily and with certainty brought into correct alignment with bosses 39 and 40 (or 39a and 40a) and with bolt holes 36 and 37 in register.

When vehicle sub-assemblies such as these of the present invention are used, even the packaging of partially assembled vehicles is advanced, for with the cross-member factory assembled into the vehicle body and a standard front axle beam sub-assembly being packaged with the body, there is no possibility of packing a front steering sub-assembly with a body to which it is not adapted. This could occur where prior structures are used having the axle beam integral with the cross-member, and hence not being adapted to a plurality of vehicle models.

Hitherto, to save crating space, the steering gear mounting brackets were not mounted to the vehicle body at the factory, but at retail outlets. With the present construction, the cross-member may now be rigidly and permanently attached to the body by riveting or spot welding at the factory without increasing crating sizes or crating and shipping costs. The entire front axle mounting structure is such that maximum strength with low design weight is obtainable in a dirigible wheel mounting, which, further, requires only a minimum of mechanical intelligence and skill for proper final assembly at the retailing level.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:

1. In a juvenile wheeled vehicle having a sheet metal body and a pair of steering wheels, a steering wheel suspension structure comprising a cross-plate adapted for attachment transversely to and within the said body; a steering shaft; and a steering wheel mounting sub-assembly carried by said cross-plate including an axle beam plate, steering knuckles pivotally mounted at opposite ends of said axle beam plate and adapted to mount said wheels, a tie rod linking the steering knuckles, and a drag link for operatively connecting the steering shaft to the mechanical combination comprised of the tie rod and steering knuckles; said plates being adapted in form to fit together in overlapping relation and to rotatably mount said steering shaft therethrough, said plates having in the overlapping portions thereof registrable fastening bolt receiving apertures.

2. In a juvenile wheeled vehicle having a sheet metal body and a pair of steering wheels, a steering wheel suspension structure comprising a cross-plate adapted for attachment transversely to and within the said body; a steering shaft; a steering wheel mounting sub-assembly carried by said cross-plate including an axle beam plate, steering knuckles pivotally mounted at opposite ends of said axle beam plate and adapted to mount said wheels, a tie rod linking the steering knuckles, and a drag link for operatively connecting the steering shaft to the mechanical combination comprised of the tie rod and steering knuckles; said plates being adapted in form to fit together in overlapping definite relation and to rotatably mount said steering shaft therethrough, said plates having in the overlapping portions thereof fastening bolt receiving apertures; and a pair of dependent pull strap pedal arms pivotally mounted to one of said plates.

3. In a juvenile wheeled vehicle having a sheet metal body and a pair of steering wheels, a steering wheel suspension structure comprising a cross-plate adapted for attachment transversely to and within the said body; a steering shaft; a steering wheel mounting sub-assembly attached to said cross-plate including a pair of steering knuckles for carrying said wheels, an axle beam plate provided at the ends thereof with journal structures for journaling the said steering knuckles, a tie rod linking the steering knuckles, and a drag link for operatively connecting the steering shaft to the mechanical combination comprised of the tie rod and steering knuckles; said plates having overlapping portions of complementary form adapting them to fit together in definite relation and having in the overlapping portions bosses adapted to nest together and fastening bolt receiving apertures in register, said bosses being adapted to receive therethrough the said steering shaft.

4. A structure as described in claim 3 wherein one of said plates is provided with a pair of depending pedal arms pivotally mounted thereon.

5. A structure as described in claim 3 wherein one of said plates is provided with lug formations spaced inwardly from the overlapping edge thereof to receive thereunder the overlapping edge of the other plate.

6. In a juvenile wheeled vehicle having a sheet metal body and a pair of steering wheels, a steering wheel suspension structure comprising a cross-plate adapted for attachment transversely to and within the said body; a steering shaft; and a steering wheel mounting sub-assembly carried by said cross-plate including an axle beam plate, steering knuckles pivotally mounted at opposite ends of said axle beam plate and adapted to mount said wheels, a tie rod linking the steering knuckles, and a drag link for operatively connecting the steering shaft to the mechanical combination comprised of the tie rod and steering knuckles; said plates having overlapping portions of complementary form adapting them to fit together in definite relation, said plates having in the overlapping portions thereof fastening bolt receiving apertures in register and obliquely disposed bosses adapted to nest together and to receive therethrough said steering shaft, and said plates being provided with strengthening grooves and flanges.

7. In a juvenile wheeled vehicle having a sheet metal body and a pair of steering wheels, a steering wheel suspension structure comprising a cross-plate adapted for attachment to and within the said body; a steering shaft; and a steering wheel mounting sub-assembly carried by said cross-plate including an axle beam plate, steering knuckles pivotally mounted at opposite ends of said axle beam and adapted to mount said wheels, a tie rod linking the steering knuckles and a drag link for operatively connecting the steering shaft to the mechanical combination comprised of the tie rod and steering knuckles; said plates being adapted in form to fit together in overlapping definite relation, one of said plates having lug formations spaced inwardly from the overlapped edge thereof to receive thereunder the overlapping edge of the other plate, and said plates having in the overlapping portions thereof fastening bolt receiving apertures in register and obliquely disposed bosses adapted to nest together, one of said bosses having a flanged aperture to receive and journal said steering shaft.

8. A structure as described in claim 7, wherein the boss of the axle beam plate is provided with said flanged aperture.

9. In a juvenile wheeled vehicle having a sheet metal body and a pair of steering wheels, a steering wheel suspension structure comprising a cross-plate adapted for attachment to and within the said body; a steering shaft; a steering wheel mounting sub-assembly attached to said cross-plate including a pair of steering knuckles for carrying said wheels, an axle beam plate provided at the ends thereof with journal structures for journaling the said steering knuckles, a tie rod linking the steering knuckles, and a drag link for operatively connecting the steering shaft to the mechanical combination comprised of the tie rod and steering knuckles; said plates having overlapping portions of complementary form adapting them to fit together in definite relation and having in the overlapping portions slotted complementary bosses adapted to nest together and fastening bolt receiving apertures in register, the said slotted bosses jointly forming an aperture adapted to receive the steering shaft.

10. A structure as described in claim 9 wherein said cross-plate is provided with a pair of pedal arms pivotally mounted thereon.

11. A structure as described in claim 9 wherein one of said plates is provided with lug structures spaced inwardly from the overlapped edge thereof and adapted to receive thereunder the overlapping edge of the other plate.

12. In a juvenile wheeled vehicle having a sheet metal body, a pair of pull strap pedal arms, and a pair of steering wheels, a steering wheel suspension structure comprising: a cross-plate adapted for attachment transversely to and within the said body and having journal formations on the rear side thereof for pivotally mounting said pull straps; a steering shaft having a lever arm on a forward lower end thereof; a steering wheel mounting sub-assembly attached to said cross-plate including a pair of steering knuckles for carrying said wheels, an axle beam plate provided at the ends thereof with journal structures for journaling the said steering knuckles, a tie rod forward of said axle beam plate linking the steering knuckles, and a drag link for operatively connecting the steering shaft lever arm to the mechanical combination comprised of the tie rod and steering knuckles; said plates having overlapping portions of complementary form adapting them to fit together in definite relation and having in the overlapping portions bosses adapted to nest together and fastening bolt receiving apertures in register, said bosses being adapted to receive the steering shaft therethrough with the said lever arm forward of said plates.

13. For a juvenile wheeled vehicle having a pair of steering wheels and a sheet metal body, a steering gear and mounting therefor comprising: a first sub-assembly mounted to the vehicle body including an upper stamped sheet metal cross-plate adapted in form for attachment to and within the vehicle body and a pair of pull strap pedal arms with lateral pivot extensions, said cross-plate having rearward extensions stamped from the metal and formed about the said pivot extensions to pivotally mount the pedal arms; a steering shaft having on a lower end thereof a lever arm; a second sub-assembly mounted to the cross-plate including a pair of steering wheel mounting knuckles each having a vertical pivot portion provided with axially spaced radially projecting locating formations, a lower axle beam plate having the ends thereof curled about said pivot portions of the knuckles between the locating formations to form journals for the said knuckles, a tie rod forward of the axle beam plate connecting said knuckles, and a drag link for operative connection of the steering shaft lever arm with the tie rod; said plates having overlapping portions of complementary form adapting them to fit together in register for attachment to each other, including fastening bolt receiving apertures and stamped out lug formations spaced inwardly from the overlapped edge of each plate and adapted to receive thereunder the overlapping edge of the other plate, and the plates having oblique nesting bosses in the overlapping portions adapted to receive said steering shaft therethrough with the said lever arm forward of the plates.

ALVIN P. DOUGLAS.
LEONARD J. WALTERS.

References Cited in the file of this patent
UNITED STATES PATENTS

| Number | Name | Date |
|---|---|---|
| 1,354,141 | Sleffel | Sept. 28, 1920 |
| 2,080,922 | Kraeft | May 18, 1937 |
| 2,104,346 | Kraeft | Jan. 4, 1938 |
| 2,172,811 | Snell | Sept. 12, 1939 |
| 2,227,436 | Buckwalter | Jan. 7, 1941 |